United States Patent
Xu

(10) Patent No.: US 10,451,741 B2
(45) Date of Patent: Oct. 22, 2019

(54) TIME OF FLIGHT CAMERA

(71) Applicant: Microsoft Technology Licensing, LLC, Redmond, WA (US)

(72) Inventor: Zhanping Xu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 15/582,702

(22) Filed: Apr. 30, 2017

(65) Prior Publication Data

US 2018/0313955 A1    Nov. 1, 2018

(51) Int. Cl.
| | | |
|---|---|---|
| G01C 3/08 | (2006.01) | |
| G01S 17/89 | (2006.01) | |
| G01S 17/32 | (2006.01) | |
| G01S 7/497 | (2006.01) | |
| G01S 7/491 | (2006.01) | |
| G01S 7/493 | (2006.01) | |
| H04N 5/225 | (2006.01) | |

(52) U.S. Cl.
CPC .............. *G01S 17/89* (2013.01); *G01S 7/493* (2013.01); *G01S 7/497* (2013.01); *G01S 7/4915* (2013.01); *G01S 17/32* (2013.01); *H04N 5/2256* (2013.01)

(58) Field of Classification Search
CPC .......... G01S 17/89; G01S 17/32; G01S 7/493; G01S 7/497; G01S 7/4915; H04N 5/2256
USPC ........................................................ 356/5.01
See application file for complete search history.

(56) References Cited

U.S. PATENT DOCUMENTS

| | | | |
|---|---|---|---|
| 5,455,669 A | 10/1995 | Wetteborn | |
| 5,489,149 A | 2/1996 | Akasu | |
| 6,624,418 B1 | 9/2003 | Braunwarth et al. | |
| 8,587,771 B2 | 11/2013 | Xu et al. | |
| 8,786,678 B2 | 7/2014 | Schmidt et al. | |
| 9,219,859 B2 | 12/2015 | Hwang et al. | |
| 9,297,889 B2 | 3/2016 | Hudman et al. | |
| 2008/0106724 A1 | 5/2008 | Braune et al. | |
| 2014/0218340 A1 | 8/2014 | Rai et al. | |
| 2016/0119611 A1* | 4/2016 | Hall | H04N 5/2256 348/46 |
| 2017/0041589 A1* | 2/2017 | Patil | G01S 17/36 |

FOREIGN PATENT DOCUMENTS

| | | |
|---|---|---|
| DE | 4006678 C1 | 5/1996 |
| DE | 19707418 A1 | 8/1998 |
| DE | 19908214 A1 | 9/2000 |

OTHER PUBLICATIONS

Dorrington, et al., "Separating true range measurements from multi-path and scattering interference in commercial range cameras", In Proceedings of SPIE Three-Dimensional Imaging, Interaction, and Measurement, vol. 7864, Jan. 27, 2011, 10 pages.

Zhanping Xu, Measurement results by foreground referencing method and comparison experiments, Cobra System based measurement examples, May 11, 2010, 8 Pages.

* cited by examiner

Primary Examiner — Mark Hellner

(57) ABSTRACT

A continuous wave time of flight (CW-TOF) camera operable to determine distances to features in a scene that are corrected for light that the camera transmits that is back scattered to a photosensor in the camera by structural features of the camera.

20 Claims, 6 Drawing Sheets

TIME OF FLIGHT CAMERA

BACKGROUND

A "continuous wave" time of flight (TOF) camera (CW-TOF), transmits a "continuous wave" of electromagnetic radiation, optionally infrared (IR) light, having intensity that is periodically modulated to illuminate a scene that the camera images. Light reflected from the transmitted light by a given feature in the scene reaches the camera as a wave of reflected light having a same modulation as the transmitted light but retarded in phase by a propagation phase delay, "$\varphi_d$". The propagation phase delay is a function of a round trip time "$t_R$" for light transmitted by the camera to propagate from the camera to the given feature and back to camera, and thereby a distance, "d", to the feature. The camera images the light reflected by the given feature on a pixel of a photosensor for each of a plurality of exposure periods to accumulate electric charge, "photocharge", that the imaged light generates in the pixel during the exposure period. For each of the exposure periods, sensitivity of the photosensor to light is modulated at a different sampling phase offset relative to phase of modulation of light that the camera transmits. The amount of photocharge accumulated for a given sampling phase offset is proportional to a convolution of the exposure period associated with the sampling phase offset and the reflected light, and is a function of propagation phase delay $\varphi_d$. The CW-TOF camera processes the accumulated photocharges for the different sampling phase offsets to provide corresponding voltages and uses the voltages to determine $\varphi_d$ and therefrom a distance d to the feature.

SUMMARY

An aspect of an embodiment of the disclosure relates to providing a CW-TOF camera having reduced sensitivity to error generated by light reflected from light transmitted by the camera light source back to the camera photosensor by structural features of the camera. Light reflected by features of the CW-TOF camera to the camera photosensor may be referred to as "leakage light" or "back-scattered light". For convenience of presentation, effects of leakage light or back-scattered light on images acquired by the camera may be referred to as "back-scattered light interference" (BSLI) and back-scattered light may be referred to as "BSLI light".

In an embodiment, the CW-TOF camera has a controller, and a memory having stored therein data, hereinafter also referred to as "calibrated back-scatter data". Back-scatter data may define amounts of photocharge pixels in the camera photosensor are expected to accumulate responsive to back-scattered light, and/or corresponding voltages based on the photocharge, for at least one known intensity of light transmitted by the camera light source during at least one exposure period having known duration and sensitivity to light. Photocharge generated in a pixel by back-scattered light may be referred to as back-scatter, or BSLI, photocharge, and voltage based on the BLSI photocharge may be referred to as back-scatter or BSLI voltage. A known intensity of light of the at least one known intensity may be referred to as a "calibration intensity" and a known exposure period of the at least one exposure period may be referred to as a "calibration exposure period". An amount of BSLI photocharge that a pixel accumulates during a calibration exposure period for a given calibration intensity of light transmitted by the CW-TOF camera may be referred to as a "calibration BSLI photocharge". Voltage based on calibration BSLI photocharge that a pixel accumulates may be referred to as "calibration BSLI voltage". The controller is configured to process calibrated back-scatter data to reduce error due to BSLI photocharge that may contaminate photocharge accumulated by the camera's photosensor pixels during an exposure period that the camera uses to acquire an image of a scene. Processing calibrated back-scatter data may comprise processing calibration BSLI photocharges and/or calibration BSLI voltages stored in the controller memory to provide an estimate of expected BSLI voltages that may contaminate respective voltages provided by pixels in the camera for a scene that the camera images. The controller may subtract the estimated BSLI voltages from the voltages that the pixels provide for the image to provide a corrected image of the scene having reduced error due to BSLI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Light that a CW-TOF camera images on a photosensor pixel during an exposure period is not limited to transmitted light that propagates from the camera light source to the given feature and back to the camera. In general, a portion, BSLI light, of the light that the camera light source transmits to illuminate a scene is reflected to the pixel by structural features of the camera and also generates photocharge, BSLI photocharge, which the pixel accumulates during the exposure period. The BSLI photocharge contaminates photocharge generated in the pixel by light reflected by the feature imaged on the pixel and generates error in the phase delay $\varphi_d$, and thereby in distance d that the CW-TOF camera determines for the feature.

In the discussion below operation of a CW-TOF camera is discussed with reference to FIG. 1A, which illustrates the CW-TOF camera imaging a scene in the absence of BSLI to acquire a range image of the scene that provides distances to features of the scene. BSLI and its effects on determination of propagation phase delays $\varphi_d$ and distances to features in the scene are discussed with reference to FIG. 1B, which schematically shows the CW-TOF camera shown in FIG. 1B imaging the same scene but in the presence of BSLI. Structure and operation of a CW-TOF camera configured in accordance with an embodiment of the disclosure to compensate for error in propagation phase delay $\varphi_d$ and distance based on $\varphi_d$ that BSLI generates are discussed with reference to FIG. 2. Discussion of methods for calibrating a CW-TOF camera to provide the camera with calibrated back-scatter data are discussed with reference to FIGS. 3A-3C.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one, or any combination of more than one of the items it conjoins.

Figure 1A:
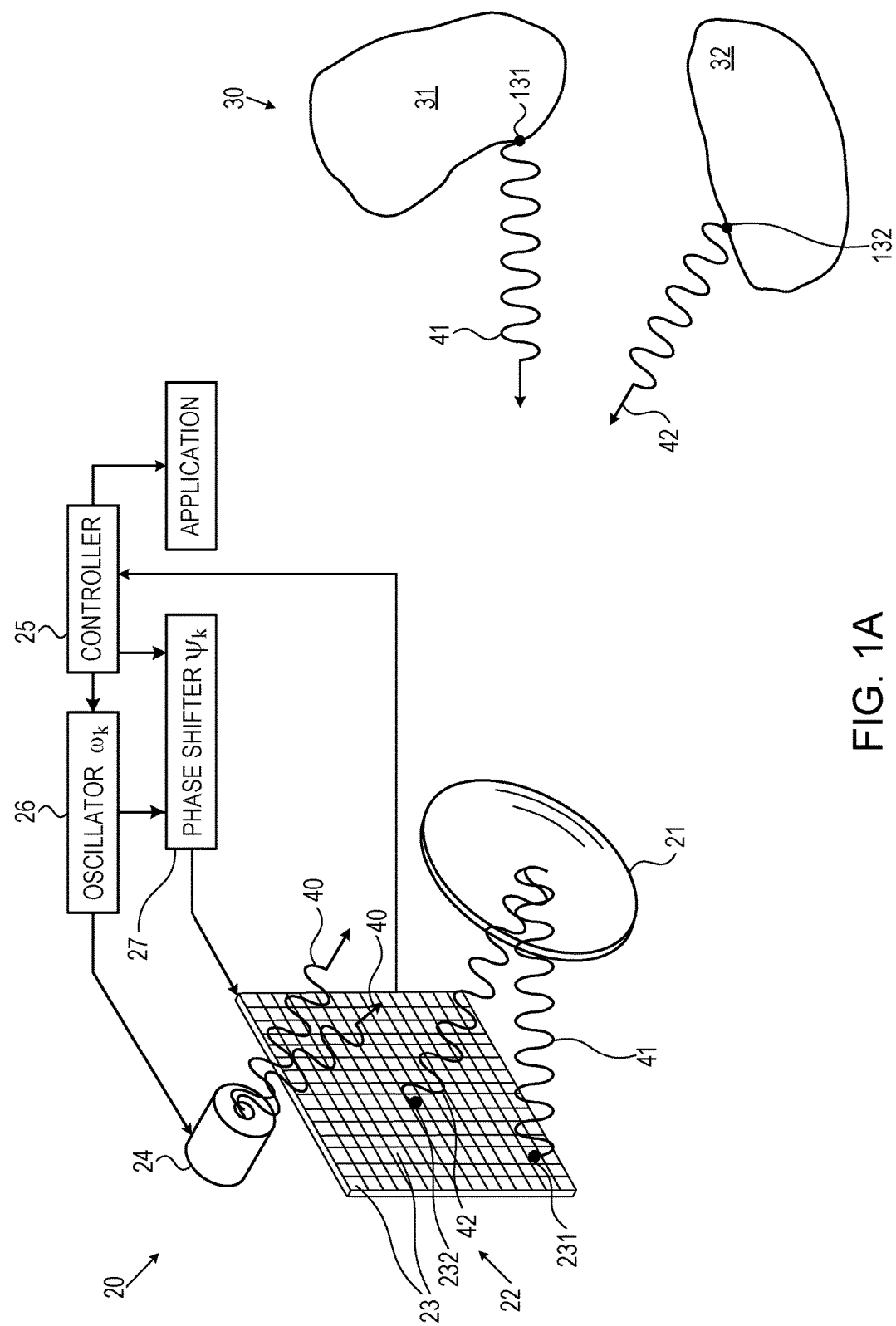
FIG. 1A schematically shows a CW-TOF camera determining distances to features in a scene in the absence of back-scattered light interference (BSLI)

FIG. 1A schematically shows a CW-TOF camera 20 operating to determine distances to features in a scene 30 optionally having objects 31 and 32. CW-TOF camera 20, which is represented very schematically, comprises an optical system represented by a lens 21, and a photosensor 22 having an array of rows and columns of pixels 23 on which optical system 21 images features of scene 30. A given pixel 23 in photosensor 22 may be designated p(i,j), where "i" and "j" are indices that indicate a row and a column respectively of photosensor 22 in which the pixel is located. A feature in scene 30 that CW-TOF camera 20 images on a pixel p(i,j) may be referred to as a feature f(i,j), and/or by a reference label. CW-TOF camera 20 may comprise a light source 24, an oscillator 26, a phase shifter 27, and a controller 25 that controls components comprised in the CW-TOF camera.

To acquire a range image of scene 30, controller 25 controls CW-TOF camera 20 to acquire a plurality of K images of scene 30, each at a different sampling phase offset $\Psi_k$ of a plurality of K sampling phase offsets ($1 \leq k \leq K$), where $\Psi_k$ is equal to $2\pi(k-1)/K$ and K is an integer. For a k-th image of the K images, controller 25 controls oscillator 26 to provide a frequency signal having angular frequency $\omega_k$ and controls light source 24 to transmit light continuously modulated at the angular frequency provided by the oscillator. Light transmitted by light source 24 is schematically represented by a wavy line 40 having an arrow indicating direction of propagation of the transmitted light. While illuminating scene 30 with light 40, controller 25 turns on photosensor 22 for an exposure period "Ex$_k$" to register light that features in scene 30 reflect from transmitted light 40 back to camera 20 and optical system 21 images on pixels 23 of photosensor 22. During the exposure period controller 25 modulates sensitivity of photosensor 22 at angular frequency $\omega_k$ provided by oscillator 26, but controls phase shifter 27 to shift the phase of modulation of the photosensor by a sampling phase offset $\Psi_k$ relative to phase of modulation of transmitted light 40. Optionally, angular frequency $\omega_k$ is the same for all values of k and hereinafter is assumed for convenience of presentation to be equal to an angular frequency "$\omega$".

A pixel 23 in photosensor 22 registers light reflected from a feature in scene 30 that optical system 21 images on the pixel during exposure period Ex$_k$ by accumulating photocharge that the light generates in the pixel during the exposure period. By way of example, FIG. 1A schematically shows features 131 and 132 of objects 31 and 32 respectively, reflecting light from light 40 back to CW-TOF camera 20. Reflected light from feature 131 which optical system 21 images on a pixel 23, p(i,j), designated as pixel 231 in photosensor 22 is schematically represented by a wavy line 41 having an arrow indicating direction of propagation of the light. An amount of photocharge that pixel 231 accumulates is proportional to a convolution of reflected light 41 with sensitivity of exposure period Ex$_k$. The convolution is a function of sampling phase offset $\Psi_k$ and a propagation delay $\varphi_d(131)$ resulting from a round trip time $t_R$ for light to travel from light source 24 to feature 131 and back to CW-TOF camera 20. In symbols, $\varphi_d(131)=\omega t_R(131)$, where $t_R(131)$ is a round trip time for light to travel from light source 24 to feature 131 and back to the camera. Since $t_R(131)$ is equal to $2d(131)/c$, where $d(131)$ is the distance from CW-TOF camera 20 to feature 131 and c the speed of light, propagation phase delay $\varphi_d(131)$ is also equal to $2\omega d(131)/c$. Similarly, reflected light from feature 132 is schematically represented by a wavy line 42 and direction arrow, which is imaged by optical system 21 on a pixel 232, and an amount of photocharge that pixel 232 accumulates for feature 132 during exposure period Ex$_k$ is proportional to a convolution of reflected light 42 with the exposure period. The convolution is a function of sampling phase offset $\Psi_k$ and a propagation phase delay $\varphi_d(132)=2\omega D(132)/c$, which because feature 132 is closer to CW-TOF camera 20 is less than $\varphi_d(131)$.

At the end of each exposure period Ex$_k$, controller 25 reads photosensor 22 to acquire a frame of the photosensor for the sampling phase offset $\Psi_k$. The frame comprises voltages representing the accumulated photocharges and corresponding amounts of reflected light registered by pixels 23 in photosensor 22 during exposure period Ex$_k$ for features in scene 30 respectively imaged on the pixels. Controller 25 may process the voltages provided by the frames for all K sampling phase offsets $\Psi_k$, $1 \leq k \leq K$ to extract propagation phase delays $\varphi_d(i,j)$ for respective pixels p(i,j) of pixels 23 and associated distances d(i,j) for features, f(i,j), imaged on pixels p(i,j) as discussed below.

Transmitted light 40, reflected light, such as light 41 and 42 reflected from transmitted light 40 by features 131 and 132, and modulated sensitivity of pixels in photosensor 22 during an exposure period Ex$_k$ are periodic functions, and each may advantageously be expressed as a Fourier cosine series. Intensity of transmitted light 40 as a function of time during exposure period Ex$_k$ may therefore be represented by $$I_k(t) = \Sigma_0^\infty I_{k,n} \cos(n\omega t), \quad (1)$$

and intensity of light reflected from light 40 by a feature f(i,j) in scene 30 that is imaged by CW-TOF camera 20 on a given pixel p(i,j) of pixels 23 during exposure period Ex$_k$ may be represented by $$R_k(i,j,t) = \Sigma_0^\infty R(i,j)_{k,n} \cos(n\omega t + n\varphi_d(i,j)). \quad (2)$$

If the sensitivity of pixels 23 in photosensor 22 during exposure period Ex$_k$ is represented by S$_k$(t) then $$S_k(t) = \Sigma_0^\infty S_{k,n} \cos(n\omega t + \Psi_k), \quad (2)$$

and the convolution, CV$_k$(i,j), of R$_k$(i,j,t) and S$_k$(t) for pixel p(i,j), may be expressed, $$CV_k(i,j) \equiv S_k(t) * R_k(i,j,t) = \Sigma_0^\infty S_{k,n} R_{k,n} \cos(\Psi_k + \varphi_d(i,j)). \quad (3)$$

Then, if $V_k(i,j)$ is a voltage in a frame of photosensor 22 representing an amount of photocharge accumulated by pixel p(i,j) during exposure period $Ex_k$ acquired following the exposure period, $V_k(i,j,\Psi_k)$ may be written, $$V_k(i,j,\Psi_k) = \alpha CV_k(i,j) = \alpha \Sigma_0^\infty S_{k,n} R(i,j)_{k,n} \cos(\Psi_k + \varphi_d(i,j)), \quad (4)$$

where α is a proportionality coefficient.

For intensity of transmitted light characterized by a single dominant modulation frequency and/or for which harmonics of the dominant frequency may advantageously be ignored, transmitted light 40 may be approximated by an expression, $$I_k(t) = \Sigma_0^\infty I_{k,n} \cos(n\omega t) \cong I_o + I_1 \cos \omega t, \quad (5)$$

and reflected light from a feature f(i,j) in scene 30 imaged on a pixel p(i,j) advantageously approximated by an expression, $$R_k(i,j,t) = \Sigma_0^\infty R(i,j)_{k,n} \cos(n\omega t + n\varphi_d(i,j)) \cong R_o + R_1 \cos(\omega t + \varphi_d(i,j)). \quad (6)$$

Assuming that modulation of sensitivity of photosensor 22 during an exposure period $Ex_k$ may be expressed, $$S_k(t) = \Sigma_0^\infty S_{k,n} \cos(n\omega t + \Psi_k) \cong S_o + S_1 \cos(\omega t + \Psi_k), \quad (7)$$

the convolution of exposure period $Ex_k$ and light $R_k(i,j,t)$ reflected by a feature f(i,j) in scene 30 and imaged on a pixel 23 p(i,j) becomes, $$CV_k(i,j) = S_o R(i,j)_o + 0.5 \cdot S_1 R(i,j)_1 \cos(\Psi_k + \varphi_d(i,j)), \quad (8)$$

and voltage representing the photocharge accumulated by p(i,j) during the exposure period, $$V_k(i,j,\Psi_k) = \alpha CV_k(i,j) = \alpha[S_o R(i,j)_o + 0.5 \cdot S_1 R(i,j)_1 \cos(\Psi_k + \varphi_d(i,j))]. \quad (9)$$

The expression for voltage may be written in a form, $$V_k(i,j,\Psi_k) = A(i,j) + B(i,j) \cos(\Psi_k + \varphi_d(i,j)) \quad (10)$$

Controller 25 may determine propagation phase delay $\varphi_d(i,j)$ for a feature f(i,j) imaged on pixel p(i,j) in accordance with an expression, $$\varphi_d(i,j) = a\tan[-\Sigma_{k=1}^{k=K} V_k(i,j,\Psi_k)\sin(\Psi_k)/\Sigma_{k=1}^{k=K} V_k(i,j,\Psi_k)\cos(\Psi_k)] = a\tan[-\Sigma_{k=1}^{k=K} B(I,j)\cos(\Psi_k + \varphi_d(i,j))\sin(\Psi_k)/\Sigma_{k=1}^{k=K} B(i,j)\cos(\Psi_k + \varphi_d(i,j))\cos(\Psi_k)]] \quad (11)$$

and distance d(i,j) to feature f(i,j) in accordance with, $$d(i,j) = [c/2\omega]\varphi_d(i,j). \quad (12)$$

By way of specific example, for feature 131 of object 31 that CW-TOF camera 20 images on pixel 231, controller 25 may determine a propagation phase delay $$\varphi_d(231) = a\tan[-\Sigma_{k=1}^{k=K} V_k(231,\Psi_k)\sin(\Psi_k)/\Sigma_{k=1}^{k=K} V_k(231,\Psi_k)\cos(\Psi_k)], \quad (13)$$

and distance to the feature, $$d(131) = [c/2]\varphi_d(231). \quad (14)$$

The discussion above referencing features in FIG. 1A assumes absence of BSLI and that therefore amounts of photocharge accumulated by pixels 23 during an exposure period $Ex_k$ are generated only by light from light that light source 24 transmits that is reflected by features in scene 30. However, in general, accumulation of photocharge by pixels in a CW-TOF camera is generally contaminated by photocharge generated by BSLI light-light that is reflected by structural features of CW-TOF camera 20 from light that the light source transmits.

Figure 1B:
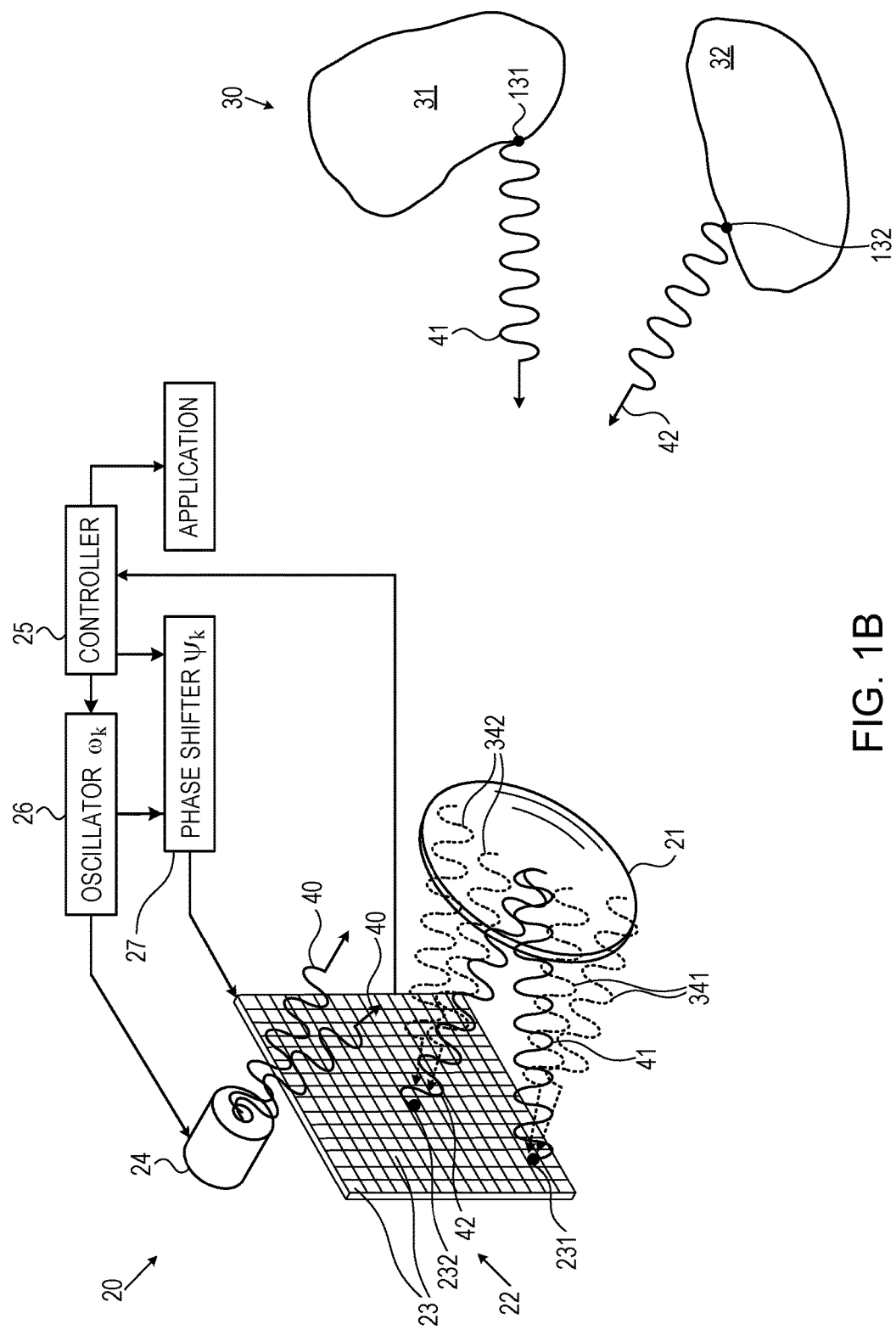
FIG. 1B schematically shows the CW-TOF camera shown in FIG. 1A determining distances to features in the scene in the presence of BSLI.

FIG. 1B by way of example schematically shows CW-TOF camera 20 imaging scene 30 in the presence of BSLI. The figure illustrates how BSLI light may affect photocharge accumulated by pixels 23 in photosensor 22, and by way of particular example how BSLI light affects photocharge accumulated by pixels 231 and 232 on which CW-TOF camera 20 images reflected light from features 131 and 132 during an exposure period $Ex_k$ of photosensor 22.

FIG. 1B, schematically shows that some of light 40 transmitted by light source 24 that reaches pixels 231 and 232 is BSLI light represented by dashed wavy lines 341 and 342 respectively, which is reflected by optical system 21 to the pixels, rather than by features 131 and 132. It is noted that whereas FIG. 1B schematically shows BSLI light generated by reflections from optical system 21, BSLI light may be generated by reflections from structural features of CW-TOF camera 20 other than structural features of optical system 21. BSLI light 341 and 342 is considered to represent BSLI light generated by reflections that reaches pixels 231 and 232 from any structural features of CW-TOF camera 20.

For a given intensity $I_k(t)$ of light transmitted by light source 24 during an exposure period $Ex_k$ let "I-BSLI$_k$(i,j,t)" represent intensity of BSLI light reaching a pixel p(i,j) that images feature f(i,j), such as BSLI light 341 and 342 that reaches pixels 231 and 232 on which CW-TOF camera 20 images features 131 and 132 in scene 30. In general, I-BSLI$_k$(i,j,t) is expected to be proportional to $I_k(t)$. Proportionality between I-BSLI$_k$(i,j,t) and $I_k(t)$ may also be a function of a set, "SOP$_k$", comprising at least one operating parameter having a value that characterizes an operating condition or operating conditions under which CW-TOF camera 20 acquires images of a scene during exposure period $Ex_k$. The set of operating parameters SOP$_k$ may comprise by way of example, at least one or any combination of more than one of camera operating temperature "T", zoom settings, "Z", of optical system 21, and/or wavelength λ of light that light source 24 transmits. Let $\beta(i,j,SOP_k)$ represent a proportionality coefficient that expresses dependence of I-BSLI$_k$(i,j,t) on $I_k(t)$. Assuming that $I_k(t)$ is given by expression (5), intensity of BSLI light that reaches pixel p(i,j) as a function of time during exposure period $Ex_k$ maybe written, $$I\text{-BSLI}_k(i,j,t,SOP_k) = \beta(i,j,SOP_k)[I_o + I_1 \cos \omega t]. \quad (15)$$

In general, it is expected that SOP$_k$ will be the same for all exposure periods $Ex_k$ and hereinafter the subscript "k" will be omitted.

Since photocharge generated in a photosensor pixel p(i,j) by light incident on the pixel is generally a linear function of the incident light, an amount of photocharge accumulated by pixel p(i,j) during exposure period $Ex_k$, is a sum of photocharge generated by light reflected by feature f(i,j) and photocharge generated by BSLI light that reaches pixel p(i,j) during $Ex_k$. As a result, expression (9) for voltage $V_k(i,j,\Psi_k)$ based on photocharge accumulated by pixel p(i,j) during exposure period $Ex_k$ in the absence of BSLI becomes in the presence of BSLI, $$V_k(i,j,\Psi_k) = [\alpha(S_o R(i,j)_o + 0.5 \cdot S_1 R(i,j)_1 \cos(\Psi_k + \varphi_d(i,j)))] + [\alpha\beta(i,j,SOP)(S_o I_o + 0.5 \cdot S_1 I_1 \cos(\Psi_k + \varphi_{bsli}(i,j)))]. \quad (16)$$

In expression (16) the first term in square brackets, is the term to the right of the equal sign in expression (9). The term, as noted above, represents voltage provided by pixel p(i,j) responsive to light reflected by feature f(i,j), and is a function of propagation phase delay $\varphi_d(i,j)$ from which distance d(i,j) to feature f(i,j) may be determined, for example in accordance with expressions (13) and (14). The second term in square brackets in expression (16) represents BSLI voltage produced by BSLI light incident on pixel p(i,j) that contributes to error in determining d(i,j), and is characterized by a BSLI propagation phase delay dependency, "$\varphi_{bsli}(i,j)$", that is different from $\varphi_d(i,j)$. The terms in the first and second brackets of expression (16) may conveniently be represented by $V_k(i,j,\Psi_k,I_k,\tau_k,SOP)_d$ and $V_k(i,j,\Psi_k,I_k,\tau_k,SOP)_{bsli}$ respectively, and expression (16) may be rewritten, $$V_k(i,j,\Psi_k,I_k,\tau_k,SOP)=V_k(i,j,\Psi_k,I_k,\tau_k,SOP)_d+V_k(i,j,\Psi_k,I_k,\tau_k,SOP)_{bsli}, \quad (17)$$

Dependence of the various voltage terms in expression (16) on intensity $I_k(t)$ of light 40 transmitted by light source 24 to illuminate a scene imaged by CW-TOF camera 20 during an exposure period $Ex_k$, duration "$\tau_k$" of the exposure period, and operating parameters SOP of the camera during $Ex_k$ is explicitly shown. The first term in expression (17) may be referred to as a "distance voltage" and the second term in the expression may be referred to as a "BSLI voltage".

Figure 2:
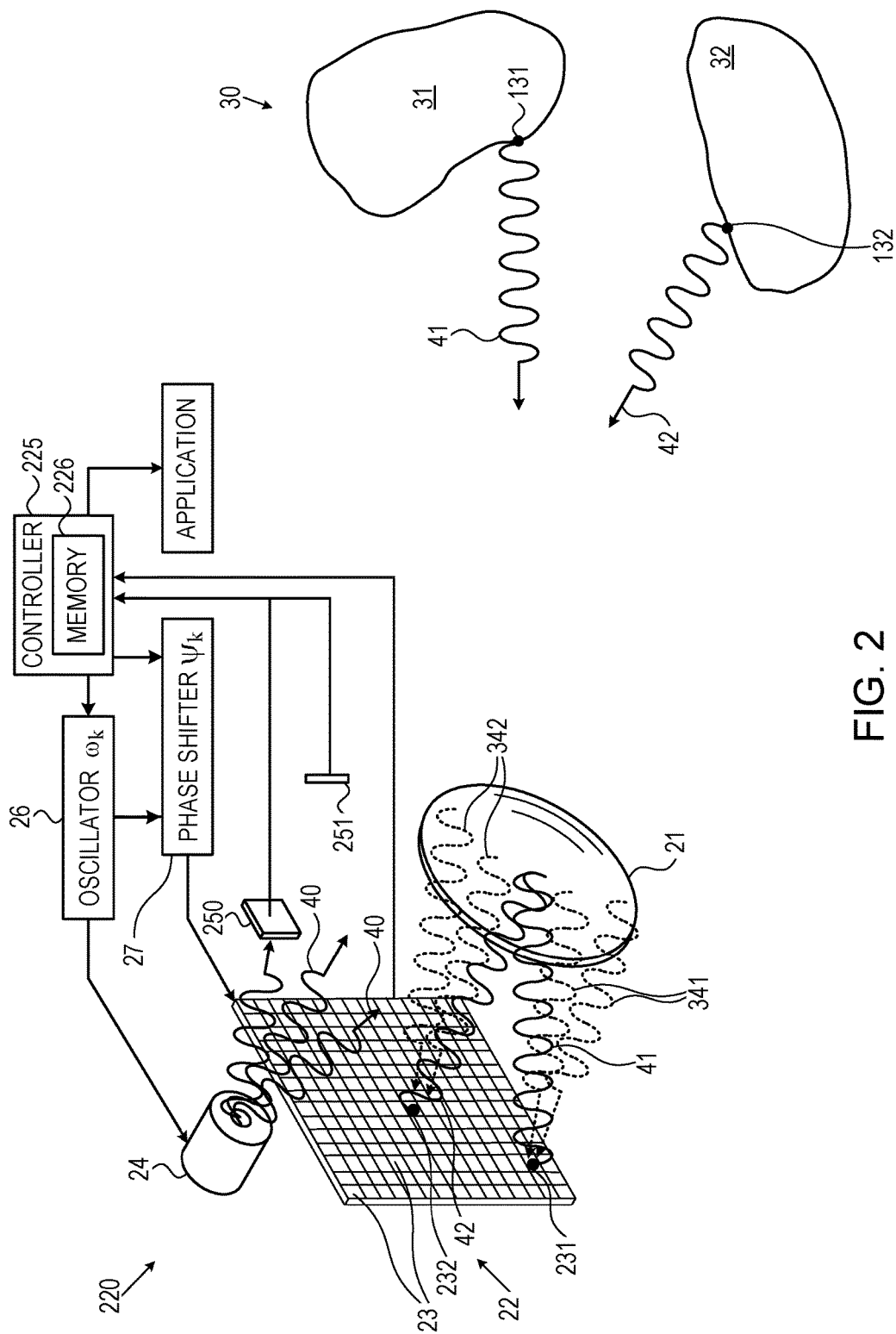
FIG. 2 shows a CW-TOF camera configured to exhibit enhanced resistance to BSLI error determining distance to features in the scene shown in FIGS. 1A and 1B, in accordance with an embodiment of the disclosure.

FIG. 2 schematically shows a CW-TOF camera 220 configured to moderate error generated by BSLI in distances $d(i,j)$ that the CW-TOF camera determines for a features $f(i,j)$ of scene 30, in accordance with an embodiment of the disclosure. CW-TOF camera 220 may comprise same components as CW-TOF camera 20 but includes in place of controller 25 a controller 225 having a memory 226 comprising calibrated back-scatter data. For BSLI scaling or calibration, optionally, CW-TOF camera 225 comprises at least one optical detector 250 operable to provide measures of intensity $I_k(t)$ of transmitted light 40, and/or BSLI light reflected from structural features of the CW-TOF camera and/or light source 24. An optical detector of the at least one optical detector 250 may be located to receive a portion of light 40 transmitted by light source 24 to provide measurements of intensity of the transmitted light. In an embodiment, an optical detector of the at least one optical detector 250 may be located to receive a portion of BSLI light that is reflected by a structural element of CW-TOF camera 220 to provide measurements of intensity of the BSLI light. In an embodiment, CW-TOF camera 220 comprises at least one temperature sensor 251 operable to provide measures of operating temperatures of the CW-TOF camera. Changes in operating temperature T may generate changes in distances between structural features of CW-TOF camera 220, changes in reflectivity of the features, and changes in power spectrum of light source 24 that may affect BSLI light incident on pixels 23 of photosensor 22 during an exposure period $Ex_k$. Controller 225 is configured to use calibrated back-scatter data stored in memory 226, and optionally measurements provided by optical detector 250 and/or temperature sensor 251, as described below to reduce BSLI error in images of a scene that the camera acquires.

In an embodiment, calibrated back-scatter data may comprise data defining at least one BSLI calibration voltage for each of a plurality of pixels 23, $p(i,j)$, in photosensor 22, and for each of the at least one BSLI calibration voltage, at least one or any combination of more than one of a sampling phase offset $\Psi_k$, calibration intensity "$I_c$", calibration exposure period duration "$\tau_c$", and at least one operating parameter of a calibration set of operating parameters $SOP_c$ for which the BSLI calibration voltage was acquired. Optionally, the calibrated back-scatter data comprises a continuous function for each pixel $p(i,j)$ that provides a BSLI calibration voltage as a function of at least one or any combination of more than one of $I_c$, $\tau_c$, and/or an operating parameter of $SOP_c$. Let a calibration voltage stored in memory 226 for a given sampling phase shift $\Psi_k$, and variables $I_c$, $\tau_c$, and $SOP_c$, be represented by $V_k^*(i,j,\Psi_k,I_c,\tau_c,SOP_c)_{bsli}$.

To correct an image acquired by CW-TOF camera 220 for BSLI for which a pixel $p(i,j)$ provides a voltage $V_k(i,j,\Psi_k,I_k,\tau_k,SOP)$ given by expression (17), controller 225 processes calibrated back-scatter data for at least one calibration voltage $V_k^*(i,j,\Psi_k,I_c,\tau_c,SOP_c)_{bsli}$ to determine an expected value, "$\varepsilon V_k(i,j,\Psi_k,I_k,\tau_k,SOP)_{bsli}$", for BSLI voltage $V_k(i,j,\Psi_k,I_k,\tau_k,SOP)_{bsli}$. Determining the expected value may comprise interpolating and/or scaling calibrated back-scatter data in memory 226 to determine "$\varepsilon V_k(i,j,\Psi_k,I_k,\tau_k,SOP)_{bsli}$" for a pixel $p(i,j)$ for values for $I_k$, $\tau_k$, and at least one operating parameters of SOP, for which the pixel accumulated photocharge during exposure period $Ex_k$. For example, a value for a calibration voltage $V_k^*(i,j,\Psi_k,I_c,\tau_c,SOP_c)_{bsli}$ for given calibration values $I_c$, $\tau_c$, and/or an operating parameter of $SOP_c$ may be scaled or used to interpolate to determine a value for an expected BSLI voltage provided by pixel $p(i,j)$ for a value of at least one of light intensity $I_k$, exposure duration $\tau_k$, and and/or an operating parameter of SOP. By way of a more particular example, it might be expected that change in an operating temperature, T, of CW-TOF camera 220 may generate changes in BSLI that affect imaging of camera 220 and thereby BSLI voltages $V_k(i,j,\Psi_k,I_k,\tau_k,SOP)_{bsli}$. Assume that calibrated back-scatter data in memory 226 comprises calibrated voltages $V_k^*(i,j,\Psi_k,I_c,\tau_c,SOP_c)_{bsli}$ for which $SOP_c$ has respective operating temperatures $T_1$ and $T_2$. If CW-TOF 220 acquires an image of a scene while operating at a temperature $T_3$ where $T_1<T_3<T_2$, controller 225 may interpolate an expected value $\varepsilon V_k(i,j,\Psi_k,I_k,\tau_k,SOP)_{bsli}$ based on the calibrated BSLI voltages for temperatures $T_1$ and $T_2$ in memory 226.

It is noted that in an embodiment, controller 225 may provide pixel voltages $V_k(i,j,\Psi_k,SOP)$ that are normalized to, and therefore substantially independent of transmitted light intensity and exposure period characteristics, which characteristics may include sensitivity to light as a function of time as well as duration. Memory 226 may similarly contain calibrated voltages $V_k^*(i,j,\Psi_k,SOP_c)_{bsli}$ normalized to transmitted light intensity and exposure period characteristics. For such embodiments, controller 225 may determine expected values for voltages $\varepsilon V_k(i,j,\Psi_k,SOP)_{bsli}$ without scaling and/or interpolating calibrated voltages for differences with light intensities and exposure periods for which CW-TOF camera 220 acquires images.

According to an embodiment, controller 225 corrects a voltage $V_k(i,j,\Psi_k,I_k,\tau_k,SOP)$ provided by a pixel $p(i,j)$ for error generated by BSLI, by subtracting the expected value $\varepsilon V_k(i,j,\Psi_k,I_k,\tau_k,SOP)_{bsli}$ from $V_k(i,j,\Psi_k,I_k,\tau_k,SOP)$ to provide a corrected voltage $\mathcal{C} V_k(i,j,\Psi_k,I_k,\tau_k,SOP)$, where in symbols, $$\mathcal{C}V_k(i,j,\psi_k,I_k,\tau_k,SOP) = V_k(i,j,\psi_k,I_k,\tau_k,SOP) - \varepsilon V_k(i,j,\psi_k,I_k,\tau_k,SOP)_{bsli} \cong V_k(i,j,\psi_k,I_k,\tau_k,SOP)_d.$$

In an embodiment, controller 225 may use corrected values $\mathcal{C} V_k(i,j,\Psi_k,I_k,\tau_k,SOP)$ to determine a distance $d(i,j)$ for feature $f(i,j)$ imaged on pixel $p(i,j)$, optionally using $\mathcal{C} V_k(i,j,\Psi_k,I_k,\tau_k,SOP)$ in place of $V_k(i,j,\Psi_k)$ in expression (11).

Figure 3A:
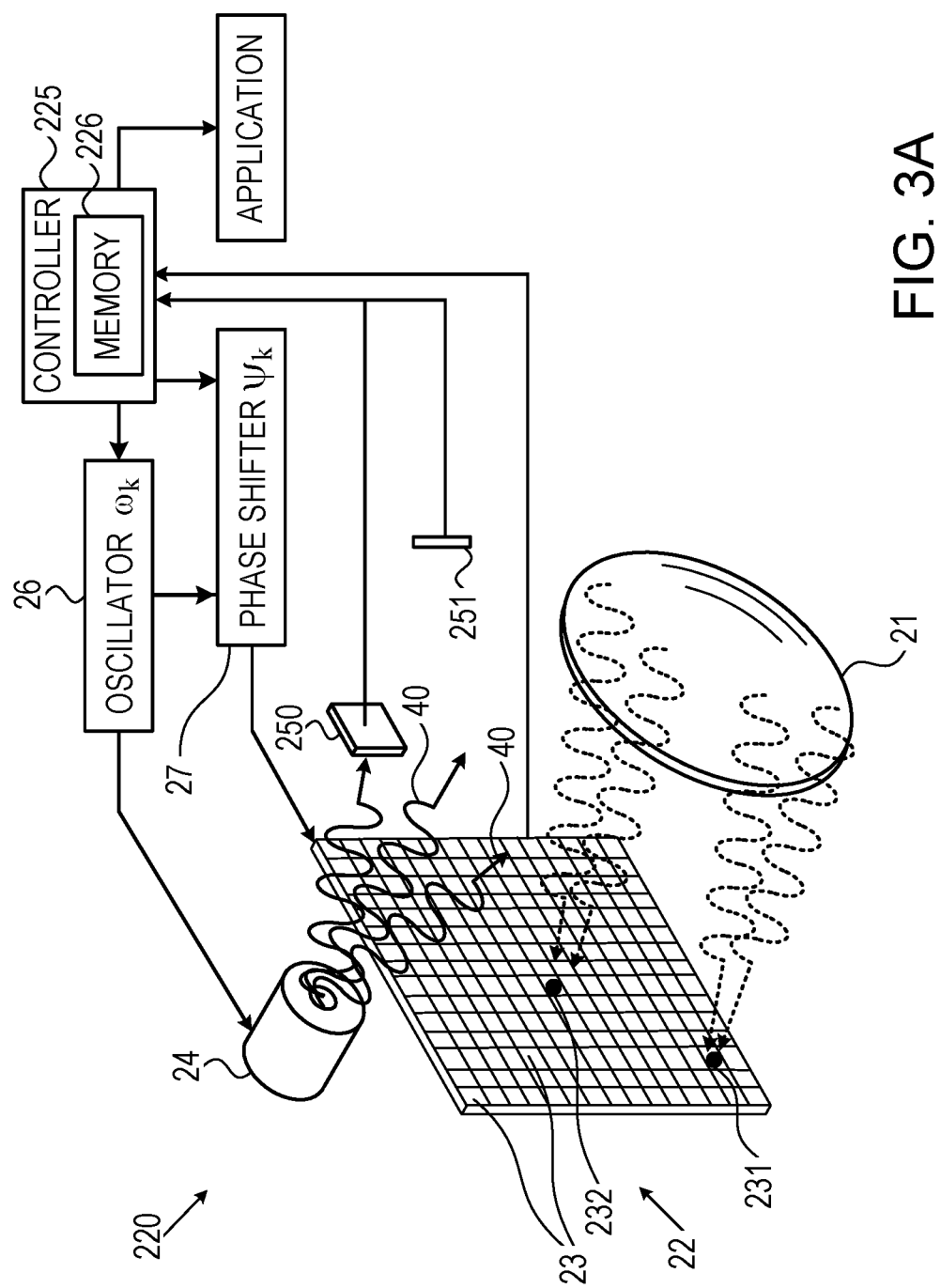
FIGS. 3A-3C schematically show calibrating the CW-TOF camera shown in FIG. 2 to provide the camera with calibrated back-scatter data, in accordance with an embodiment of the disclosure.
Figure 3B:
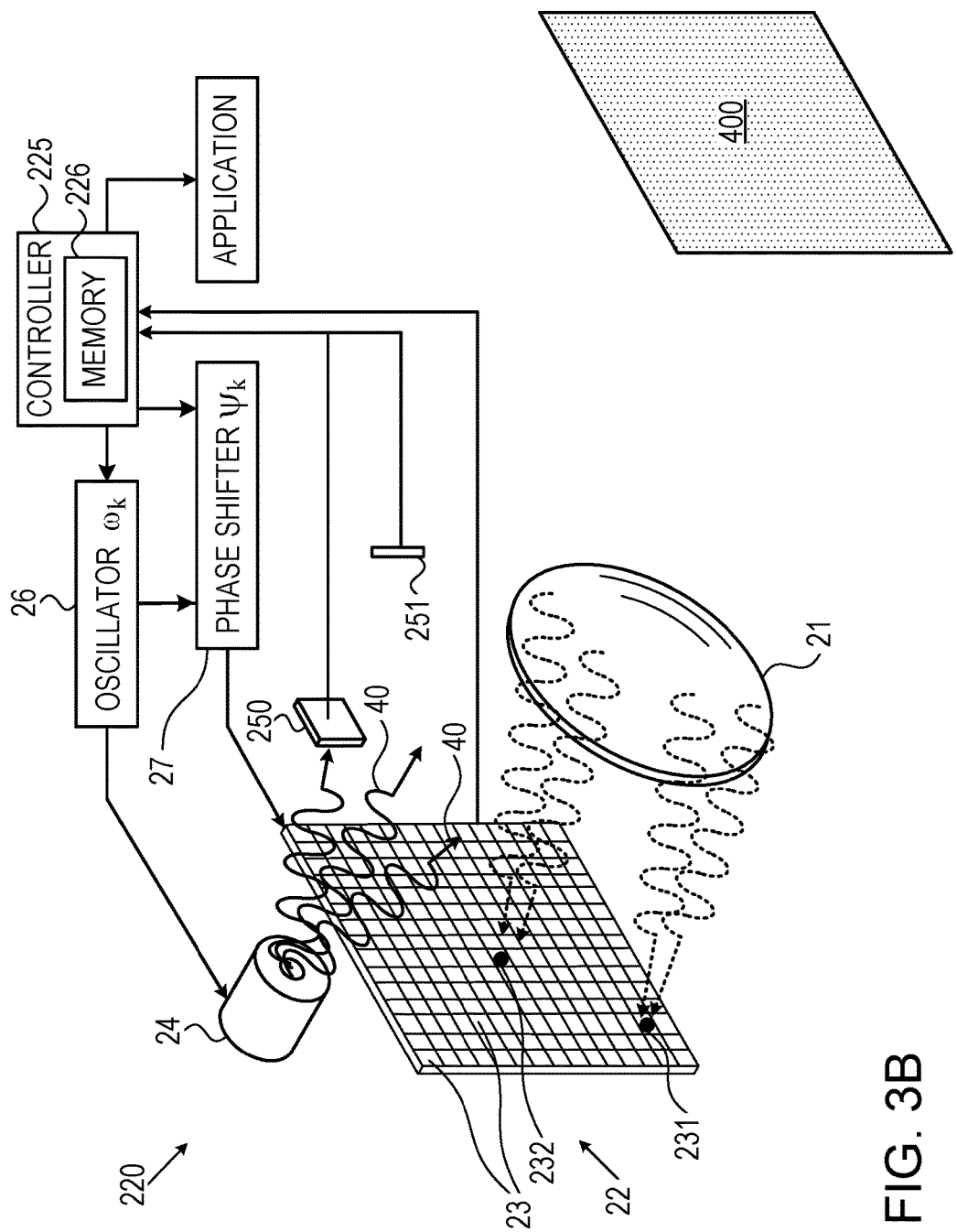
Figure 3C:
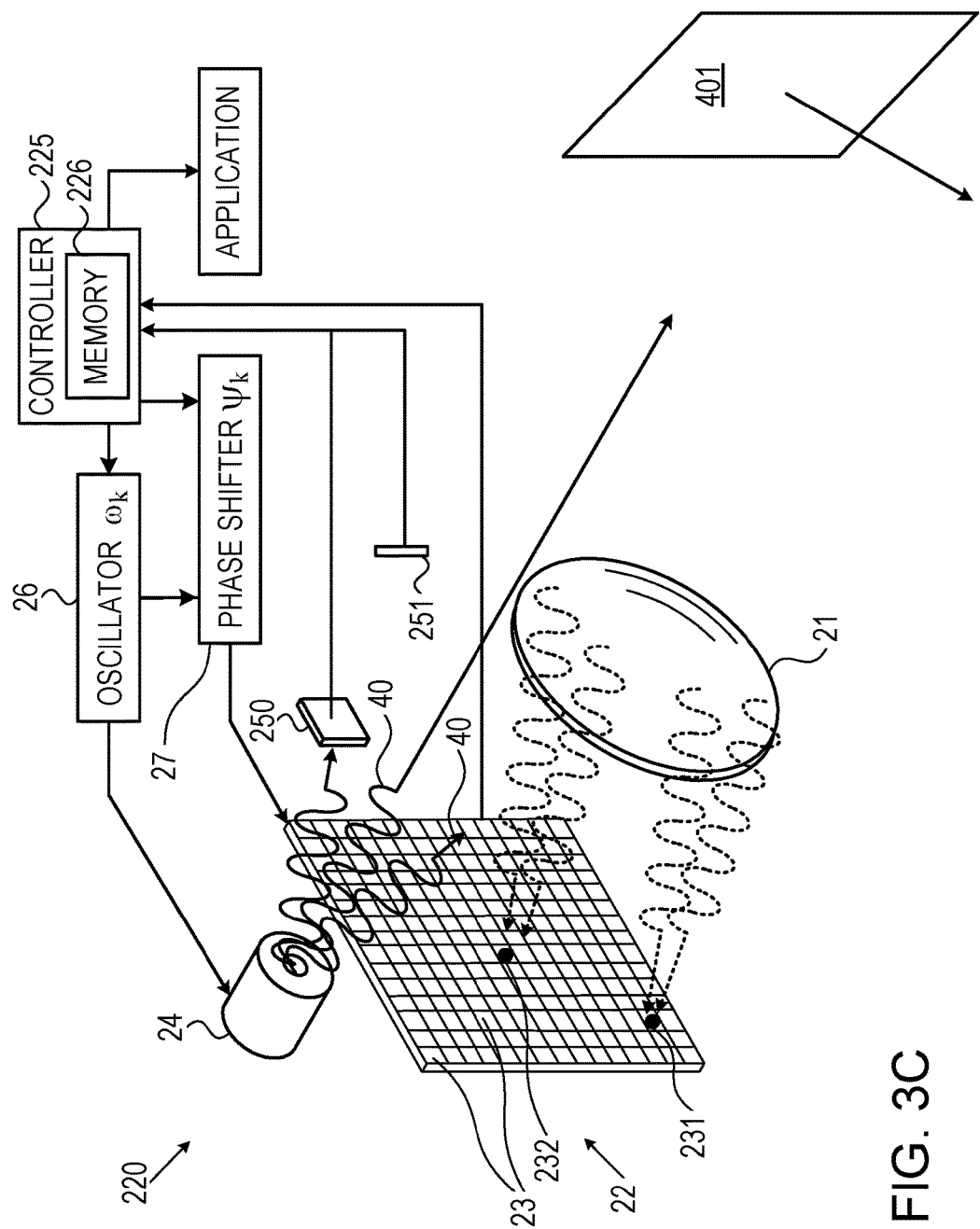

In accordance with an embodiment of the disclosure calibrating CW-TOF camera 220 to provide the camera with calibrated back-scatter data comprises operating the camera at known calibration light intensity, calibration exposure period, and set of operating conditions, SOP, under conditions for which substantially only BSLI light reaches and is registered by pixels 23 of photosensor 22 during an exposure period. FIGS. 3A-3C schematically show optional arrangements for operating CW-TOF camera 220 so that during an exposure period of the camera substantially only BSLI light reaches photosensor 22.

FIG. 3A schematically shows CW-TOF camera being operated while pointed in a direction for which there are substantially no objects outside of the camera that might reflect light that light source 24 transmits. For example the CW-TOF camera may be pointed in a direction for which objects in a field of view (FOV) of the camera are so far away that light that they do reflect from light that the camera transmits is so attenuated when it reaches the camera that its intensity is substantially less than BSLI light. FIG. 3B schematically shows CW-TOF camera 220 pointed at an optical absorber 400 that absorbs light that light source 24 transmits to prevent light that is not BSLI light from reaching the camera. And FIG. 3C schematically shows CW-TOF camera 220 pointed at a reflector 401 oriented with respect to a direction along which light source 24 transmits light so that the transmitted light is specularly reflected away from the camera In the description and claims of the present application, each of the verbs, "comprise" "include", "have", and "contain" and conjugates thereof, are used with the understanding that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A continuous wave time of flight (CW-TOF) camera operable to determine distances to features in a scene, the CW-TOF camera comprising:
    a light source controllable to transmit light modulated at a modulation frequency to illuminate a scene the camera images;
    a photosensor having pixels configured to register amounts of light reflected by features in the scene and back-scattered light (BSLI light) from structural features of the camera from the transmitted light;
    a memory comprising calibrated back-scatter data that define values for amounts of BSLI light the pixels register in the absence of light reflected by features in the scene; and
    a controller configured to:
        turn on the photosensor for an exposure period during which pixels in the photosensor register light reflected by features in the scene respectively imaged on the pixels;
        modulate sensitivity of the photosensor during the exposure period at the frequency of modulation of the transmitted light but phase shifted relative to phase of the transmitted light by a sampling phase offset; and
        process calibrated back-scatter data to moderate error in distances to features in the scene that the camera provides.

2. The CW-TOF camera according to claim 1 wherein the calibrated back-scatter data comprises data based on photocharge that the pixels accumulate responsive to BSLI light for a known sampling phase offset $\Psi_k$, calibration intensity of light transmitted by the light source, and a known calibration exposure period.

3. The CW-TOF camera according to claim 2 wherein the CW-TOF camera comprises at least one optical detector that provides measurements of intensity of the light that the light source transmits and/or intensity of BSLI light and the controller uses the intensity measures to process the calibrated back-scatter data.

4. The CW-TOF camera according to claim 1 wherein the calibrated back-scatter data comprises data based on photocharge that the pixels accumulate responsive to BSLI light for a known value for at least one operating parameter that characterizes operating conditions of the camera during the exposure period.

5. The CW-TOF camera according to claim 4 wherein the at least one operating parameter comprises operating temperature "T" of the camera.

6. The CW-TOF camera according to claim 5 and comprising at least one temperature sensor that provides measures of operating temperatures of the CW-TOF camera during the exposure period and the controller is configured to use the temperature measurements to process the calibrated back-scatter data.

7. The CW-TOF camera according to claim 4 wherein the at least one operating parameter comprises a zoom setting of the CW-TOF camera during the exposure period and the controller is configured to use a value for the zoom setting during the exposure period to process the calibrated back-scatter data.

8. The CW-TOF camera according to claim 1 wherein the calibrated back-scatter data comprises a continuous function of calibration intensity, and calibration exposure period based on photocharge that the pixels accumulate responsive to BSLI light for a known sampling phase offset $\Psi_k$, and different calibration intensities of light transmitted by the light source, and different calibration exposure periods.

9. The CW-TOF camera according to claim 1 wherein the calibrated back-scatter data comprises a continuous function of at least one operating parameter that characterizes operating conditions of the camera during the exposure period based on photocharge that the pixels accumulate responsive to BSLI light for a known sampling phase offset $\Psi_k$, and different known values of the at least one operating parameter and the controller is configured to evaluate the continuous function to process the calibrated back-scatter data.

10. The CW-TOF camera according to claim 1 wherein processing the calibrated back-scatter data comprises using the calibrated back-scatter data to determine a value that provides a measure of an expected amount of BSLI light that a pixel of the pixels in the photosensor registers during the exposure period and subtracting the expected value from a measure of an amount of light that the pixel registers during the exposure period.

11. The CW-TOF camera according to claim 1 wherein data comprised in the calibrated back-scatter data comprises data generated by operating the CW-TOF camera in an environment for which intensity of BSLI light incident on the photosensor is greater than intensity of light incident on the photosensor that is reflected by objects in a field of view (FOV) of the CW-TOF camera.

12. The CW-TOF camera according to claim 11 wherein the environment comprises at least one or any combination of more than one of: an optical absorber that absorbs light transmitted by the light source; a specular reflector that reflects light transmitted by the light source away from the camera; objects in the FOV for which light they reflect is so attenuated when it reaches the camera that its intensity is substantially less than BSLI light.

13. A method of determining distances to features in a scene, the method comprising:
   calibrating a continuous wave time of flight (CW-TOF) camera having a light source controllable to illuminate a scene the camera images and a photosensor comprising pixels configured to register light, to acquire calibrated back-scatter data that determines amounts of back-scattered light (BSLI light) reflected by structural features of the camera from light transmitted by the light source that pixels in the photosensor register;
   controlling the light source to illuminate a scene with light modulated at a modulation frequency;
   turning on the photosensor for an exposure period during which pixels in the photosensor register light reflected by features in the scene respectively imaged on the pixels and BSLI light;
   modulating sensitivity of the photosensor during the exposure period at the frequency of modulation of the transmitted light but phase shifted relative to phase of the transmitted light by a sampling phase offset;
   using the calibrated back-scatter data to correct amounts of light registered by the pixels register during the exposure period for BSLI light; and
   using measures of the corrected amounts of light to determine distances to features in the scene.

14. The method according to claim 13 wherein the calibrated back-scatter data comprises data based on photocharge that the pixels accumulate responsive to BSLI light for a known sampling phase offset $\Psi_k$, calibration intensity of light transmitted by the light source, and a known calibration exposure period.

15. The method according to claim 13 and comprising acquiring measurements of intensity of the light that the light source transmits to illuminate the scene and/or intensity of BSLI light and.

16. The method according to claim 13 and comprising acquiring measurements of operating temperatures of the CW-TOF camera during the exposure period and using the temperature measurements to process the calibrated back-scatter data.

17. The method according to claim 13 and comprising determining a zoom setting of the CW-TOF camera during the exposure period and using the zoom setting to process the calibrated back-scatter data.

18. The method according to claim 13 wherein the calibrated back-scatter data comprises a continuous function of calibration intensity and calibration exposure period based on photocharge that the pixels accumulate responsive to BSLI light for a known sampling phase offset $\Psi_k$, different calibration intensities of light transmitted by the light source, and different calibration exposure periods and evaluating the continuous function to process the calibrated back-scatter data.

19. The method according to claim 13 wherein the calibrated back-scatter data comprises a continuous function of at least one operating parameter that characterizes operating conditions of the camera during the exposure period based on photocharge that the pixels accumulate responsive to BSLI light for a known sampling phase offset $\Psi_k$, and different known values of the at least one operating parameter, and evaluating the continuous function to process the calibrated back-scatter data.

20. The method according to claim 13 wherein processing the calibrated back-scatter data comprises using the calibrated back-scatter data to determine a value that provides a measure of an expected amount of BSLI light that a pixel of the pixels in the photosensor registers during the exposure period and subtracting the expected value from a measure of an amount of light that the pixel registers during the exposure period.

* * * * *